US010666820B2

(12) United States Patent
Ogura

(10) Patent No.: US 10,666,820 B2
(45) Date of Patent: May 26, 2020

(54) ELECTRONIC DEVICE CONFIGURED TO OBTAIN SETTING INFORMATION FROM EXTERNAL DEVICE, METHOD AND RECORDING MEDIUM FOR ELECTRONIC DEVICE

(71) Applicant: BROTHER KOGYO KABUSHIKI KAISHA, Nagoya (JP)

(72) Inventor: Sho Ogura, Aichi (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 16/367,173

(22) Filed: Mar. 27, 2019

(65) Prior Publication Data

US 2019/0306344 A1 Oct. 3, 2019

(30) Foreign Application Priority Data

Mar. 30, 2018 (JP) ................. 2018-069215

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ..... *H04N 1/00482* (2013.01); *H04N 1/00411* (2013.01); *H04N 1/00891* (2013.01)

(58) Field of Classification Search
CPC ........... H04N 1/00482; H04N 1/00411; H04N 1/00891

USPC .............. 358/1.13, 1.15, 1.14, 1.1
See application file for complete search history.

(56) References Cited

U.S. PATENT DOCUMENTS

| 2007/0229897 | A1  | 10/2007 | Kato et al. |
| 2015/0070728 | A1* | 3/2015  | Ebuchi ................. G06F 3/1204 358/1.15 |
| 2016/0378412 | A1* | 12/2016 | Hayashi ................ G06F 3/1253 358/1.15 |

FOREIGN PATENT DOCUMENTS

JP 2007-274460 A 10/2007

* cited by examiner

*Primary Examiner* — Douglas Q Tran
(74) *Attorney, Agent, or Firm* — Kenealy Vaidya LLP

(57) ABSTRACT

In electronic device, a controller obtains, from an external device, a setting file containing setting item designating information and designated setting information, determines each of one or more setting items designated by the setting item designating information is which one of a fixed setting item and a variable setting item, stores the setting information regarding the setting item determined to be the fixed setting item based on the designated setting information, notify information asking for a user operation so that the receiving section receives the setting information regarding the setting item which is determined to be the variable setting item, and stores the setting information regarding the setting item determined to be the variable setting item in the memory based on the received setting information which is the setting information received by the receiving section.

13 Claims, 11 Drawing Sheets

SETTING CHANGING FILE

FILE NAME: write_auto_power_hour1.json    IFS

```
{
  "SHEET TYPE"  :"NORMAL SHEET",
  "SHEET SIZE"  :"A4",
  "IP Address"  :UserSelect,
  "Contrast"    :"+25",
}
```

FIG. 2A

SETTING OBTAINING FILE

FILE NAME: read_auto_power.json    IFG

```
{
  "SHEET TYPE"  :"",
  "SHEET SIZE"  :"",
  "IP Address"  :"",
  "Contrast"    :""
}
```

FIG. 2B

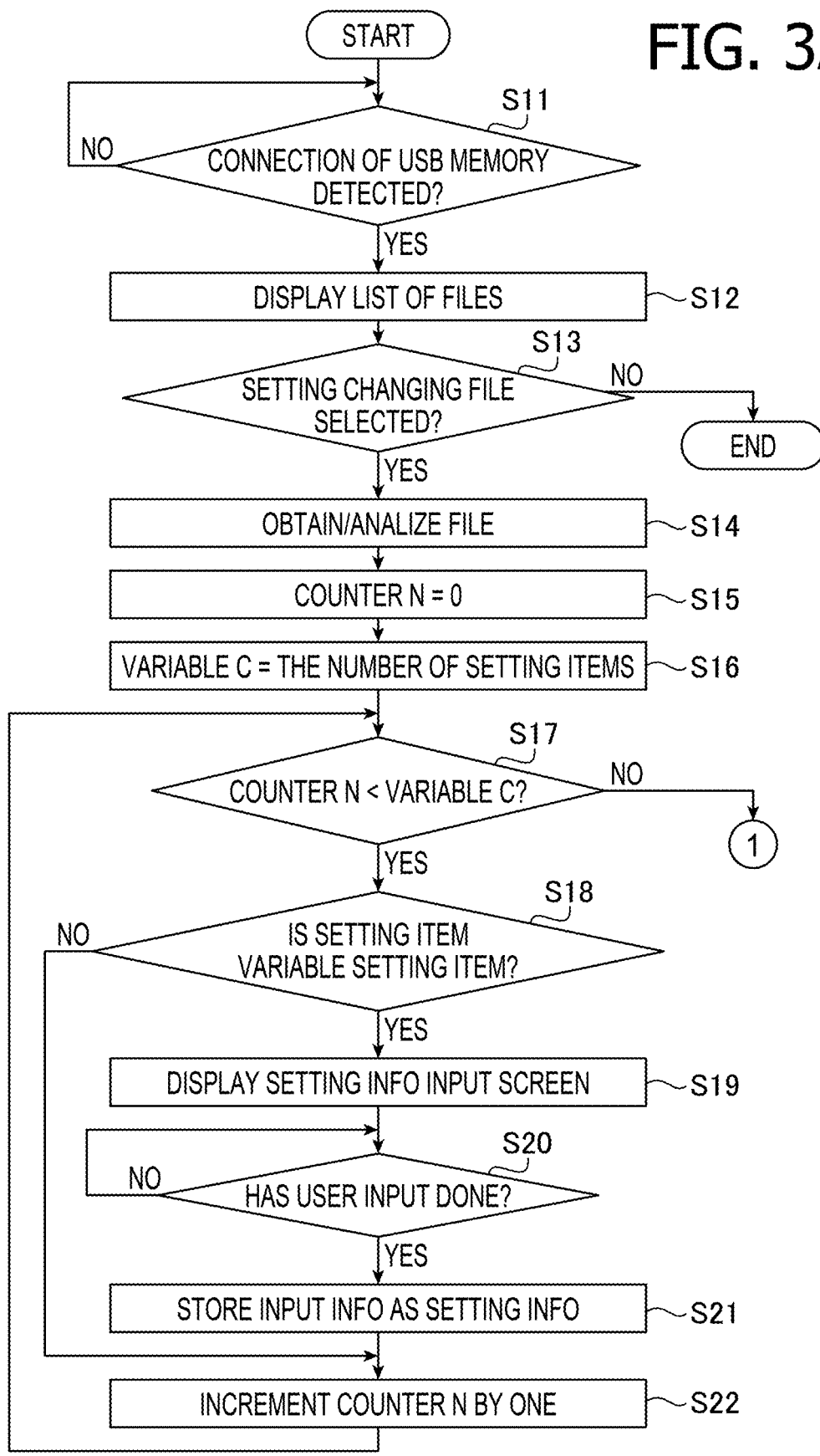

ELECTRONIC DEVICE CONFIGURED TO OBTAIN SETTING INFORMATION FROM EXTERNAL DEVICE, METHOD AND RECORDING MEDIUM FOR ELECTRONIC DEVICE

CROSS-REFERENCE TO RELATED APPLICATIONS

This application claims priority under 35 U.S.C. § 119 from Japanese Patent Application No. 2018-069215 filed on Mar. 30, 2018. The entire subject matter of the application is incorporated herein by reference.

BACKGROUND

Technical Field

The present disclosures relate to an electronic device, a method of setting an electronic device and a non-transitory computer-readable recording medium containing computer-executable instructions for setting an electronic device.

Related Art

There is known an MFP (multi-function peripheral) which is configured such that, when a removable memory storing a setting file is connected, the MFP reads out the setting file stored in the removable memory and performs a setting process based on the contents of the setting file. In the setting file, parameters used for setting a size, an orientation and the like are contained.

SUMMARY

In order to apply the above-described conventional technique utilizing the setting file to a case where there are multiple (i.e., two or more) setting items, it seems to be sufficient that multiple parameters (i.e., multiple pieces of setting information) corresponding to multiple setting items are stored in the setting file. However, when the setting process is performed for multiple electronic devices (e.g., MFP's), there might be a requirement in which some of setting items of the multiple setting items are set based on common setting information, while the other of setting items of the multiple setting items are set based on individual setting information. In such a case, different setting files should be prepared for the multiple electronic devices, respectively. Therefore, according to the conventional technique, the multiple electronic devices cannot be set efficiently.

According to aspects of the present disclosures, there is provide an electronic device having a memory, an interface configured to be connected with an external device, a receiving section configured to received input information input by a user, and a controller. The memory is configured to store setting information corresponding to a plurality of setting items regarding the electronic device, and the controller is configured to control an operation of the electronic device based on the setting information stored in the memory. The controller is configured to perform an obtaining process of obtaining, from the external device connected to the interface, a setting file containing setting item designating information and designated setting information, the setting item designating information indicating one or more setting items among a plurality of setting items regarding the electronic device, the designated setting information being setting information of at least one of the one or more setting items, a changing necessity determining process of determining each of the one or more setting items designated by the setting item designating information included in the setting file obtained in the obtaining process is which one of a fixed setting item which does not require individual setting information and a variable setting item which requires the individual setting information, a first storing process of storing the setting information regarding the setting item determined to be the fixed setting item in the changing necessity determining process based on the designated setting information included in the setting file obtained in the obtaining process, a notifying process of causing the notifying section to notify a user of information asking for the user operation so that the receiving section receives the setting information regarding the setting item determined, in the changing necessity determining process, to be the variable setting item, and a second storing process of storing the setting information regarding the setting item determined, in the changing necessity determining process, to be the variable setting item in the memory based on the received setting information which is the setting information received by the receiving section.

According to aspects of the present disclosures, there is provided a setting method of an electronic device having a memory, an interface configured to be connected with an external device, a receiving section configured to received input information input by a user and a controller, the memory being configured to store setting information corresponding to a plurality of setting items regarding the electronic device, the controller being configured to control an operation of the electronic device based on the setting information stored in the memory. The method including an obtaining process of obtaining, from the external device connected to the interface, a setting file containing setting item designating information and designated setting information, the setting item designating information indicating one or more setting items among a plurality of setting items regarding the electronic device, the designated setting information being setting information of at least one of the one or more setting items, a changing necessity determining step of determining each of the one or more setting items designated by the setting item designating information included in the setting file obtained in the obtaining step is which one of a fixed setting item which does not require individual setting information and a variable setting item which requires the individual setting information, a first storing step of storing the setting information regarding the setting item determined to be the fixed setting item in the changing necessity determining step based on the designated setting information included in the setting file obtained in the obtaining step, a notifying step of causing the notifying section to notify a user of information asking for a user operation so that the receiving section receives the setting information regarding the setting item determined, in the changing necessity determining step, to be the variable setting item, and a second storing step of storing the setting information regarding the setting item determined, in the changing necessity determining step, to be the variable setting item in the memory based on the received setting information which is the setting information received by the receiving section.

According to aspects of the present disclosures, there is provided a non-transitory computer-readable recording medium for an electronic device having a memory, an interface configured to be connected with an external device, a receiving section configured to received input information input by a user and a controller, the memory being configured to store setting information corresponding to a plurality of setting items regarding the electronic device, and the controller being configured to control an operation of the electronic device based on the setting information stored in the memory. The instructions cause, when executed by the controller, the electronic device to perform an obtaining process of obtaining, from the external device connected to the interface, a setting file containing setting item designating information and designated setting information, the setting item designating information indicating one or more setting items among a plurality of setting items regarding the electronic device, the designated setting information being setting information of at least one of the one or more setting items, a changing necessity determining process of determining each of the one or more setting items designated by the setting item designating information included in the setting file obtained in the obtaining process is which one of a fixed setting item which does not require individual setting information and a variable setting item which requires the individual setting information, a first storing process of storing the setting information regarding the setting item determined to be the fixed setting item in the changing necessity determining process based on the designated setting information included in the setting file obtained in the obtaining process, a notifying process of causing the notifying section to notify a user of information asking for a user operation so that the receiving section receives the setting information regarding the setting item determined, in the changing necessity determining process, to be the variable setting item, and a second storing process of storing the setting information regarding the setting item determined, in the changing necessity determining process, to be the variable setting item in the memory based on the received setting information which is the setting information received by the receiving section.

BRIEF DESCRIPTION OF THE ACCOMPANYING DRAWINGS

FIG. 1 is a block diagram of a system including an MFP according to a first illustrative embodiment of the present disclosures.

FIG. 2A schematically shows an example of a setting file.

FIG. 2B schematically shows an example of a setting obtaining file.

FIGS. 3A and 3B show a flowchart illustrating a setting process executed by the MFP shown in FIG. 1.

DETAILED DESCRIPTION OF THE EMBODIMENTS

First Embodiment

Figure 1:
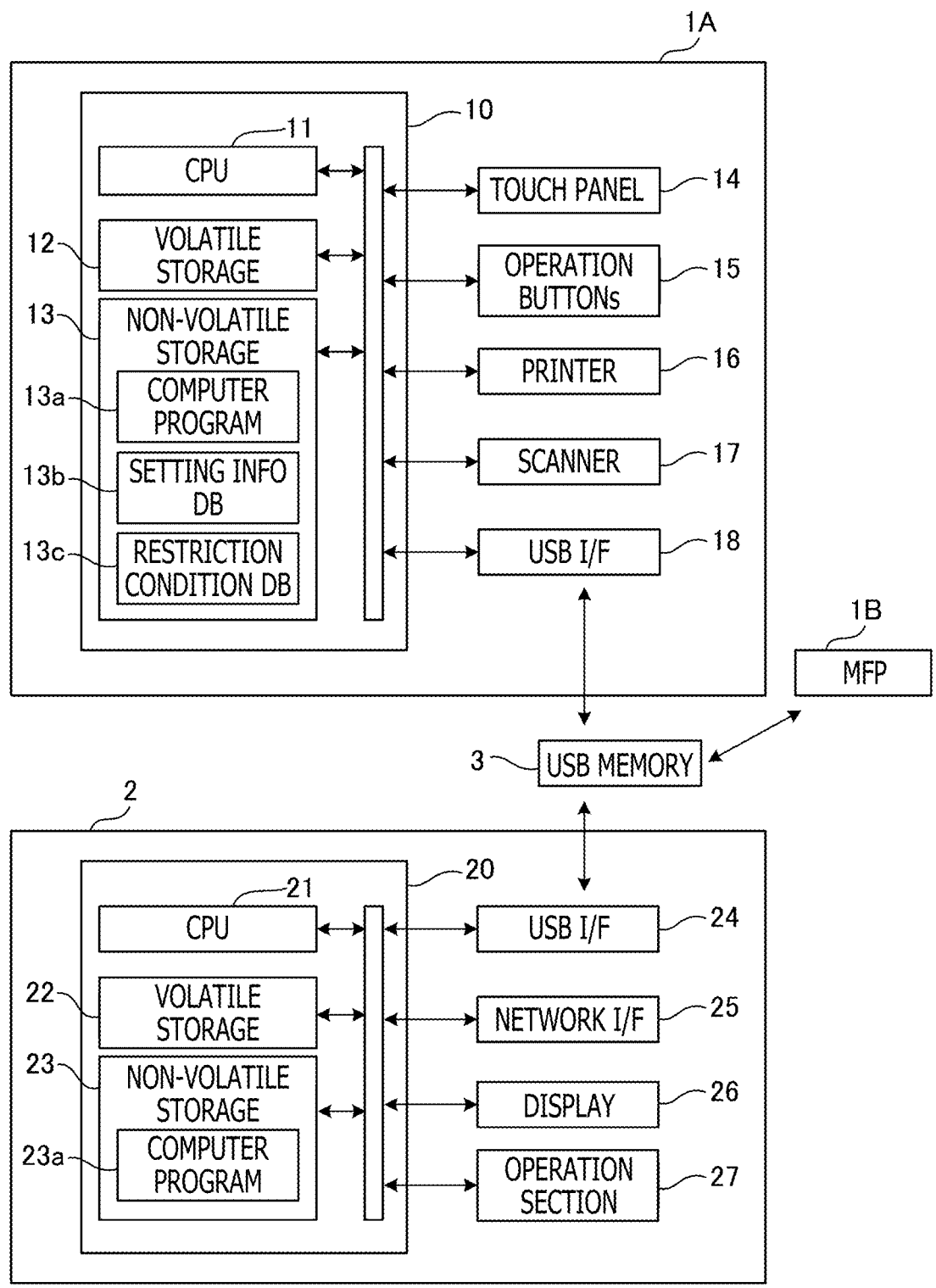

Hereinafter, referring to the accompanying drawings, an MFP 1A according to a first illustrative embodiment of the present disclosures will be described. The MFP 1A, which is an electronic device having a printing function and a scanning function, according to a first illustrative embodiment will be described. As shown in FIG. 1, the MFP 1A is configured to perform data exchange, through a USB memory 3, with a PC 2 or another MFP 1B.

According to the first illustrative embodiment, it is assumed that each of the MFP 1A and the MFP 1B is not connected to a communication network.

According to the first illustrative embodiment, a configuration of the MFP 1B is the same as that of the MFP 1A. Therefore, hereinafter, a configuration of only the MFP 1A will be described. As shown in FIG. 1, the MFP 1A has a controller 10 which includes a CPU 11, a volatile storage 12 and a non-volatile storage 13. To the controller 10, a touch panel 14, operation buttons 15, a printer 16, a scanner 17 and a USB I/F 18 are electrically connected.

The touch panel 14 is a user interface having an input function and a displaying function. That is, the user can input information through the touch panel 14, and various screens can be displayed on the touch panel 14. The printer 16 is configured to print images on a sheet with use of a laser technology (e.g., an electrophotographic imaging method). As a modification, the printer 16 may be configured to print images with use of an inkjet printing technology. The scanner 17 is configured to generate scan data by optically reading objects such as documents and images with use of a photoelectric conversion element such as a CCD or a MOS. The USB I/F 18 is compliant with the USB standard, and a USB memory 3, which is a removable element, can be connected to the CPU 11 through the USB I/F 18. The CPU 11 can communicate with the USB memory 3 to perform data communication through the USB I/F 18. According to the first illustrative embodiment, the MFP 1A has a direct print function and capable of obtaining file names of image files stored in the USB memory 3, which is connected to the USB I/F 18, displaying the same on the touch panel 14, obtaining an image file corresponding to a file name selected by a user, and printing the same.

The volatile storage 12 is, for example, a RAM, and provides a buffer area for temporarily storing various pieces of intermediate data, which is created when the CPU 11 operates. The non-volatile storage 13 is, for example, a hard disk drive and/or a flash memory, and stores a computer program 13a, setting information DB (database) 13b, and restriction condition DB 13c. The volatile storage 12 and the non-volatile storage 13 are memories of the MFP 1A.

The computer program 13a is stored in the non-volatile storage 13 of the MFP 1A. The computer program 13a may be provided in the form of data stored in a CD-ROM or a DVD-ROM. The CPU 11 performs controlling of the MFP 1A by executing the computer program 13*a*.

In the setting information DB 13*b*, multiple pieces of setting information respectively corresponding to multiple setting items regarding the MFP 1A are stored. The multiple setting items include, for example, "a sheet type", "a sheet size", "an IP address" and "a Contrast". The "sheet type" is a setting item defining a type of a sheet which is used when an image is printed by the printer 16. The setting information corresponding to this setting item (i.e., "sheet type") includes, for example, "a normal sheet", "a glossy sheet" and "a thick sheet". The "sheet size" is a setting item defining a size of the sheet which is used when an image is printed by the printer 16. The setting information corresponding to this setting item (i.e., "sheet size") includes, for example, "A4", "B5" and the like. The "IP address" is a setting item defining an IP address assigned to the MFP 1A. The setting information corresponding to this setting item (i.e., "IP address") has four numbers delimited by dots, each of four numbers being a decimal number ranging from 0 to 255. That is, the setting information of the "IP address" is, for example, "123.145.167.189". The "Contrast" is a setting item defining contrast, which represents a difference between brightness and darkness, when the image is printed by the printer 16. The setting information corresponding to this setting item (i.e., "Contrast") includes, for example, "−50", "0", "50" and the like.

The controller 10 controls the operation of the MFP 1A based on the setting information stored in the setting information DB 13*b*. As will be described later in detail, the controller 10 is configured to perform a process (hereinafter, referred to as a changing process) of changing the setting information stored in the setting information DB 13*b* and a process (hereinafter, referred to as a change obtaining process) of obtaining the setting information stored in the setting information DB 13*b*.

The restriction condition DB 13*c* stores restriction conditions restricting usable setting information for restricted setting items. The restricted setting items are items, among a plurality of setting items for the MFP 1A, for which usable information used as the setting information is restricted. For example, the "Contrast" is a restricted setting item. That is, the information usable as the setting information for the setting item "Contrast" is restricted. When the printer 16 of the MFP 1A uses the laser technology, the setting information corresponding to the item "Contrast" is restricted to have one of eleven steps of "−50", "−40", "−30", "−20", "−10", "0", "+10", "+20", "+30", "+40" and "+50". According to the first embodiment, the printer 16 uses the laser technology. Therefore, in the restriction condition DB 13*c*, the eleven steps of values "−50", "−40", "−30", "−20", "−10", "0", "+10", "+20", "+30", "+40" and "+50" are stored as settable information for the setting item of "Contrast". If the printer 16 utilizes the inkjet technology, the usable setting information for the setting item of "Contrast" is restricted to be one of five steps of values "−25", "−10", "0", "+10", "+25".

[Configuration of PC 2]

The PC 2 is provided with a controller 20 including a CPU 21, a volatile storage 22 and a non-volatile storage 23. The controller 20 is electrically connected with a USB I/F 24, a network I/F 25, a displaying 26 including a liquid crystal display or an organic electroluminescence display and an operation section 27 having a mouse and a keyboard. The USB I/F 24 is compliant with the USB standard and the USB memory 3 serving as a removable memory can be connected to the USB I/F 24. The CPU 21 is configured to perform a data communication with the USB memory 3 through the USB I/F 24. The network I/F 25 is configured to be connected with external devices including a plurality of servers through a network. The PC 2 is configured to perform data transmission/reception, through the network I/F 25, to/from external devices.

The volatile storage 22 is a RAM and provides a buffer area for the CPU 21. The non-volatile storage 23 is a hard disk and/or a flash memory, which stores computer programs 23*a*. The computer programs 23*a* is provided to the PC 2 as being stored in the CD-ROM or the DVD-ROM. By executing the computer program 23*a*, the CPU 21 serves as an application to generate a setting changing file IFS used when the controller 10 of the MFP 1A executes the above-described setting process or a setting obtaining file IFG used when controller 10 executes the setting obtaining process. It is noted that the setting inputting file IFS and the setting obtaining file IFG may be generated with use of a generally known text editing program.

An example of the setting changing file IFS will be described, referring to FIG. 2A. In this example, a name of the setting changing file IFS is "writ_auto_power_hour1.json". A first letter string (i.e., "write") indicates that the file is the setting changing file IFS used for the setting changing process. The setting input information contained in the setting changing file IFS is described with JSON (i.e., Java Script Object Notation: JavaScript being a registered trademark). The setting input information includes setting item designating information designating one or more setting items among the plurality of setting items stored in the setting information DB 13*b*, and designated information indicating designated setting information of at least one setting item from among the one or more setting items which is information on at least one setting item among the one or more setting items. That is, the setting input information is for changing the setting information regarding the setting item designated, by setting item designating information, from among the plurality of setting items stored in the setting information DB 13*b* to the designated setting information. Concretely, the setting input information includes a combination of (a pair of) a name of the setting item and setting information corresponding to the setting item indicated by the name.

According to an example shown in FIG. 2A, "SHEET TYPE", "SHEET SIZE", "IP Address" and "Contrast" are names of the setting items. "NORMAL SHEET" is setting information corresponding to the "SHEET TYPE" and "A4" is setting information corresponding to the "SHEET SIZE" and "+25" is setting information corresponding to the "Contrast". The combination of the name of the setting information and the setting information corresponding to the name of the setting information with a colon ":" sandwiched therebetween (i.e., "SHEET TYPE" and "NORMAL", "SHEET SIZE" and "A4", "Contrast" and "+25" are examples of the pair of the name of the setting item and the setting information. It is noted that, for the "IP Address", the setting information corresponding there to is indicated as "User Select". It means that the setting information corresponding to the "IP Address" should be set by a user. The character string "User Select" is an example of a first character string. It is noted that the setting information corresponding to the "IP Address" may be "123.145.167.xxx". In such a case, a character string "xxx" indicates that the user should input character string replacing the character string of "xxx". The character string "xxx" is an example of a second character string.

It is noted that the setting items designated by the setting item designating information included in the setting changing file IFS are categorized into fixed setting items which do not need individual setting information, and variable setting items which need the individual setting information. That is, when the designated setting information included in the setting changing file IFS contains the character string "User Select" (i.e., case one) and the character string "xxx" (case two), the setting item corresponding to the designated setting information is the variable setting item. Further, when the designated setting information corresponding to the setting item of the restricted setting item storing the restriction condition of the setting information in the restriction condition DB 13c is included in the setting changing file IFS and the designated setting information does not satisfy the restriction condition stored in the restriction condition DB 13c (i.e., case three), the setting item corresponding to the designated setting information is determined to be the variable setting item.

Next, referring to FIG. 2B, an example of the setting obtaining file IFG will be described. In the example shown in FIG. 2B, the file name of the setting obtaining file IFG is "read_auto_power.json". The first character string "read" of the file name indicates that the file is the setting obtaining file IFG used in the setting obtaining process. Obtaining input information included in the setting obtaining file IFG is also described using the JSON. The obtaining input information is information to designate, among a plurality of setting items corresponding to a plurality of pieces of setting information stored in the setting information DB 13b, a setting item for obtaining the setting information. The obtaining input information includes setting item designating information designated one or more setting items among the plurality of setting items stored in the setting information DB 13b. Concretely, the obtaining input information contains the names of the setting items.

In the example shown in FIG. 2B, the obtaining input information includes, as the names of the setting items, "SHEET TYPE", "SHEET SIZE", "IP Address" and "Contrast". It is noted that the obtaining input information does not include the setting information. For example, in FIG. 2B, portions opposite to the names of the setting items (e.g., "SHEET TYPE") with respect a colon (:) are all blank (i.e., only quotation marks are indicated).

It is noted that the setting changing file IFS, which is used in the setting process of the MFP 1A, may be created by the PC 2 as described above, or created by obtaining the setting information of another MFP 1B with use of the setting obtaining file IFG. Alternatively, the setting changing file IFS may be created with use of the setting obtaining file IFG as a backup of the setting information of the MFP 1A.

[Setting Process]

Next, referring to FIGS. 3A and 3B, an example of a changing process executed by the controller 10 of the MFP 1A will be described.

Figure 4:
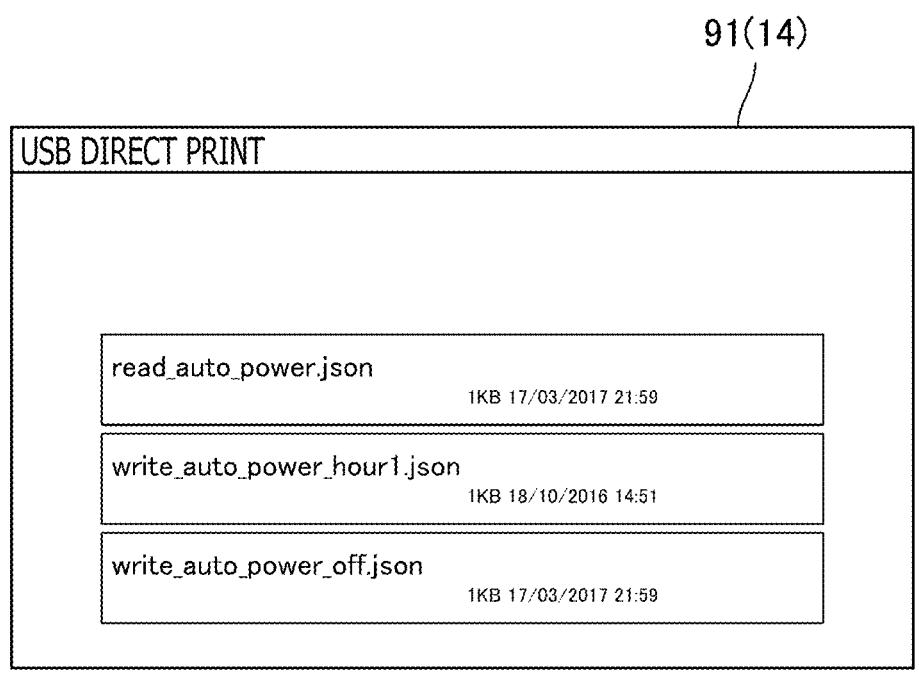
FIG. 4 shows an example of a file listing screen displayed on a touch panel shown in FIG. 1.

Firstly, the controller 10 determines whether the USB memory 3 is connected to the USB I/F 18 (S11). The determining process of S11 is repeated until the USB memory 3 is determined to be connected to the USB I/F 18. When it is determined that the USB memory 3 is connected (S11: YES), the controller 10 displays a file listing screen 91 as shown in FIG. 4 on the touch panel 14 (S12). As described above, since the MFP 1A has a direct printing function to print image file stored in the USB memory 3 connected to the USB I/F 18, the controller 10 has a function of displaying the list of files stored in the USB memory 3 on the touch panel 14 when the USB memory 3 is connected to the USB I/F 18.

In the example shown in FIG. 4, three names of three files are displayed on the file listing screen 91. Since the file name displayed at an uppermost position includes a character string "read", it is known that the file is the setting obtaining file IFG. In the file names on a second and a third line of the list includes a character string "write", and it is known that the files are setting changing files IFS. When the user tapped one of three areas, on which the respective file names are displayed, of the file listing screen 9, the controller 10 receives a user selection of a file (i.e., a selection instruction of the file) through the touch panel 14.

Next, it is determined whether the setting changing file IFS is selected from the file listing screen 91 displayed on the touch panel 14 (S13). At this stage, the controller 10 determines whether the selected file is the setting changing file IFS based on the name of the file selected by the user. That is, when the file name includes the character string "write", the controller 10 determines that the file is the setting changing file IFS.

When it is determined, in S13, that the file selected by the user is not the setting changing file IFS (S13: NO), the controller 10 terminates the setting process. When it is determined that the file selected by the user is the setting changing file IFS (S13: YES), the controller 10 obtains the file selected by the user from the USB memory 3 and analyzes information contained in the obtained file in S14 (S14 being an example of an obtaining process). Concretely, the controller 10 divides changing input information of the setting changing file IFS obtained in S14 into a combination of a name of the setting item and the setting information corresponding to the setting item indicated by the name. In the following description, it is assumed that the setting changing file IFS indicated in FIG. 2A is obtained.

Next, the controller 10 sets a counter N for counting the number of the setting items designated by the setting item designating information included in the setting file IFS obtained in S14 to zero (S15). Further, a value of a variable C is set to the number of the setting items designated by the setting item designating information included in the setting changing file IFS (S16). That is, when the setting changing file IFS obtained in S14 is the setting changing file IFS indicated in FIG. 2A, the variable C=4. Thereafter, the controller 10 determines whether the counter N is less than the variable C (S17).

When it is determined that the counter N is less than the variable C (S17: YES), the controller 10 determines, with respect to one of the setting items designated by the setting item designating information included in the setting changing file IFS obtained in S14, whether the one of the setting items is a variable setting item which requires an individual setting in S18 (S18 being an example of a changing necessity determining process). When there are multiple setting items designated by the setting item designating information included in the setting changing file IFS, a process of S18 is repeatedly executed such that a different one of multiple setting items is targeted at every execution of S18.

In the changing necessity determining process (S18), the controller 10 determines that the setting item corresponding to the designated setting information is the variable setting item when the designated setting information included in the setting changing file IFS meets following three cases:

Case 1: when the setting item corresponding to the designated setting information included in the setting changing file IFS includes a character string "User Select";

Case 2: when the setting item corresponding to the designated setting information included in the setting changing file IFS partially includes a character string "xxx"; and Case 3: when the setting item corresponding to the designated setting information included in the setting changing file IFS corresponds to the restricted setting item but does not satisfy a restriction condition stored in the restriction condition DB 13.

Figure 5A:
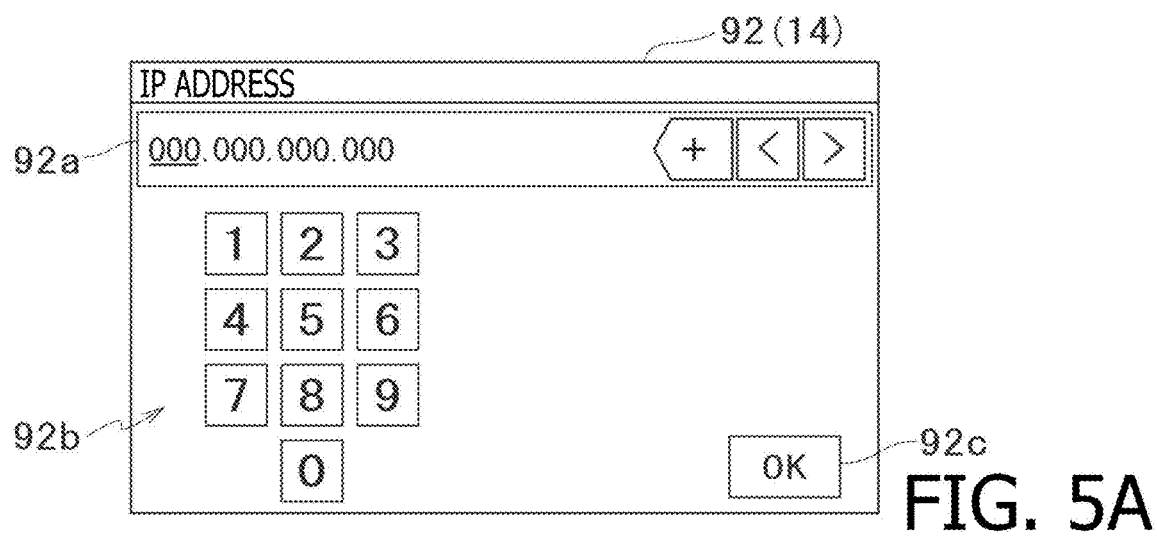
FIG. 5A is an example of a setting information input screen according to a case one displayed on the touch panel shown in FIG. 1.
Figure 5B:
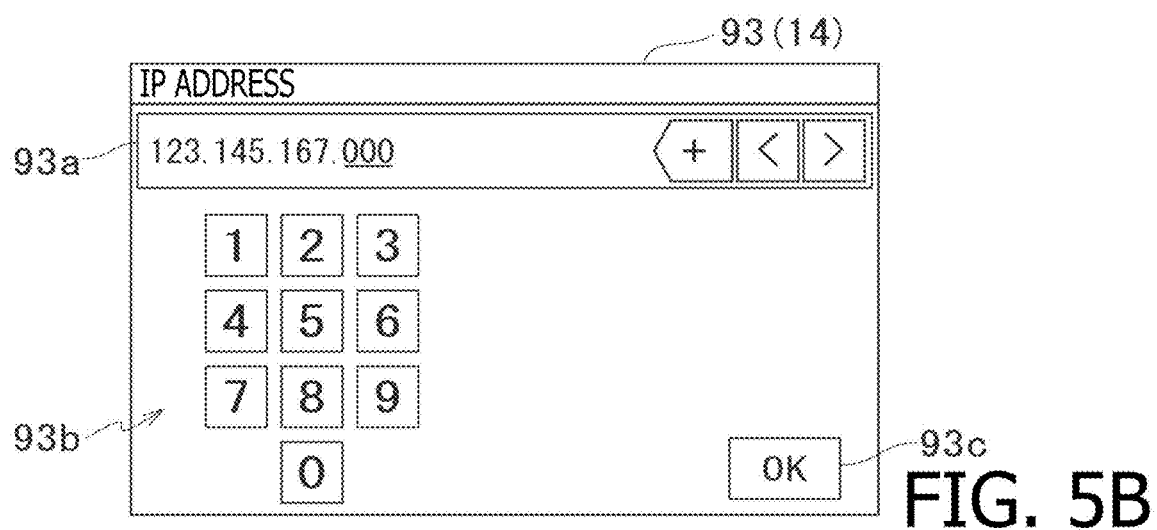
FIG. 5B is an example of a setting information input screen according to a case two displayed on the touch panel shown in FIG. 1.
Figure 5C:
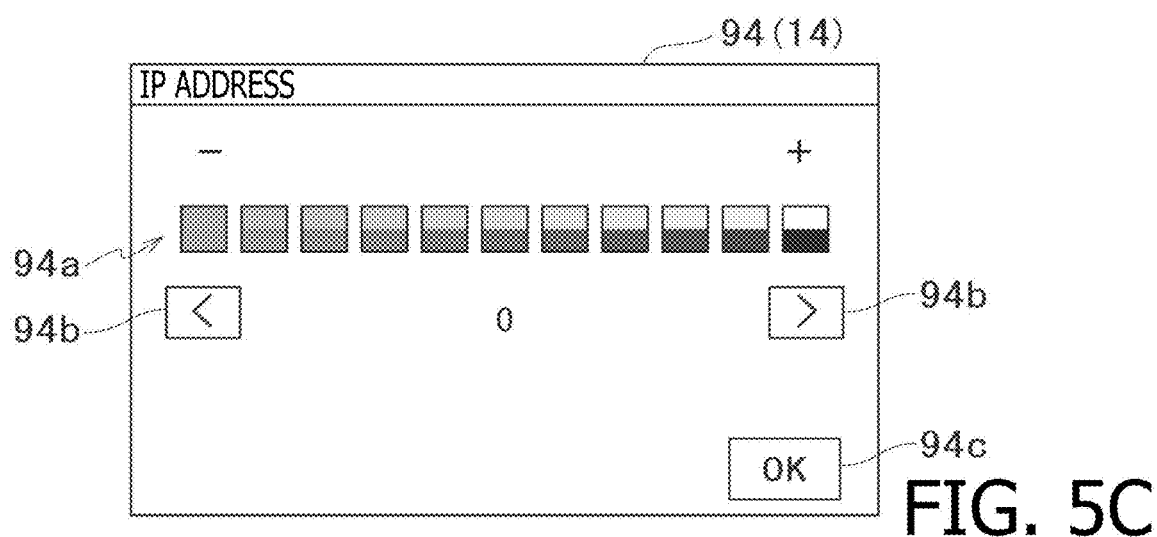
FIG. 5C is an example of a setting information input screen according to a case three displayed on the touch panel shown in FIG. 1.

When it is determined in S18 that the setting item is not the variable setting item (S18: NO), that is, when it is determined that the setting item is the fixed setting item, S19-S21 are skipped and controller 10 proceeds to S22. When it is determined that the setting item is the variable setting item (S18: YES), a setting information input screen 92, 93 or 94 as shown in FIG. 5A, 5B or 5C is displayed on the touch panel 14 (S19). By displaying the setting information input screen 92, 93 or 94, it becomes possible to notify information asking the user for an operation to receive the setting information related to the setting item determined to be the variable setting item through the touch panel 14.

When the designated setting information contained in the setting changing file IFS includes the character string "User Select" (i.e., in case 1), the controller 10 displays the setting information input screen 92 as shown in FIG. 5A. The example shown in FIG. 5A is a screen through which the setting information regarding the setting item "IP Address" is to be input. As shown in FIG. 5A, on the setting information input screen 92, an input field 92*a*, input keys 92*b* and an OK button 92*c* are displayed. In the example shown in FIG. 5A, the input field 92*a*, in which the IP Address is to be input such that four numeral strings are input into four areas delimited by dots (.), respectively, and the cursor is initially located at a leftmost area in the input field 92. When the user inputs, with the input keys 92*b*, the setting information, the cursor in the input field 92*a* sequentially moves rightward, thereby four numeral strings representing the IP address being sequentially input in the four areas of the input filed 92*a*. Thereafter, when the user operates the OK button 92*c*, the setting information (i.e., the IP address) input in the input field 92*a* is established.

Next, a case where the designates setting information included in the setting changing file IFS partially includes the character string "xxx" (i.e., the case 2), that is, a case where, for example, the designated setting information of the setting item "IP Address" is "123.145.167.xxx" will be described. In this example, the character string at the rightmost one of the four areas delimited by the dot (.) is "xxx" which is to be set individually. In this case, the setting input screen 93 as shown in FIG. 5B is displayed. As shown in FIG. 5B, on the setting information input screen 93, similar to the setting information input screen 92, an input field 93*a*, input keys 93 and an OK button 93*c* are displayed. In the example shown in FIG. 5B, in the input field 93*a* where the IP address including the four numeral strings are to be input, the cursor is located at a position corresponding to the character string "xxx" of the designated setting information (i.e., the rightmost area). Therefore, by operating the input keys 93*b*, the user can input the setting information at the area where the numeral string "000" is indicated. Thereafter, when the user operates the OK button 93*c*, the setting information (i.e., the IP address) input in the input field 93*a* is established.

Further, a case where the designated setting information included in the setting changing file IFS corresponds to the restricted setting item but does not satisfy a restriction condition stored in the restriction condition DB 13*c* (i.e., case three) will be described. For example, a case where designated setting information of the setting item "Contrast" is "+25" will be described. In this case, the controller 10 displays a setting information input screen 94 as shown in FIG. 5C so that the user can input setting information of the setting item "Contrast". On the setting information input screen 94, eleven FIG. 94*a* respectively indicating eleven degrees (i.e., eleven steps) of contrast of brightness and darkness usable as the setting information, input keys (right and left keys) 94*b* for selecting one of the eleven FIG. 94*a* and an OK button 94*c* to establish the selected setting information are displayed. As the user operates the input keys 94*b* to select one of the eleven FIG. 94*a* and operates the OK button 94*c*, a value corresponding to the brightness/darkness contrast represented by the selected FIG. 94*a* is established as the setting information.

Returning to FIG. 3A, the controller 10 determines whether the user has input the setting information (S20) after displaying the setting information input screen 92, 93 or 94 in S19. Specifically, the controller 10 determines whether the OK button 92*c*, 93*c* or 94*c* of the setting information input screen 92, 93 or 94 has been operated. Determination in S20 is repeated until it is determined that the setting information has been input. When, it is finally determined that the setting information has been input (S20: YES), the CPU stores the setting information of the setting item corresponding to the variable setting item stored in the setting information DB 13*b* as the received setting item, which is the setting information input through the setting information input screen 92, 93 or 94 in S21 (S21 being an example of a second setting process). It is noted that the second setting process of S21 can be performed in parallel with following process, and thus, a process of S22 can be started before the second setting process S21 is completed.

After starting the second setting process in S21, the controller 10 increments the counter N by one (S22) and returns to S17. At this stage, if the counter N is less than the variable C (S17: YES), that is, when the counter N has not reached the variable C which is the number of setting items designated by the setting item designating information included in the setting changing file IFS, the controller 10 executes the changing necessity determining process in S18 again. That is, among the setting items designated by the setting item designating information included in the setting changing file IFS, the setting item which is different from the previously examined setting item is subject to the changing necessity determining process. When, in the changing necessity determining process, the setting item subject to the determination is determined to be the variable setting item (S18: YES), the controller 10 displays the setting information input screen 92, 93 or 94 for receiving the setting information related to the determined setting item on the touch panel 14 (S19).

At this stage, after the previous setting information input screen 92, 93 or 94 is displayed on the touch panel 14, the next (i.e., current) setting information input screen 92, 93 or 94 is displayed without another screen being displayed on the touch panel 14. That is, the setting information input screens 92, 93 or 94 for inputting the setting information of the plurality of setting items are displayed subsequently on the touch panel 14. Therefore, the controller 10 can receive the setting information corresponding to a plurality of variable setting items subsequently.

When it is determined that the counter N is equal to or greater than the variable C (S17: NO), the counter N is set to zero (FIG. 3B: S23). Then, the controller 10 determines whether the counter N is less than the variable C (S24). When it is determined that the counter N is less than the variable C (S24: YES), the controller 10 determines, regarding one of the setting items designated by the setting item designating information included in the setting charge input file IFS obtained in S14, whether the item is the variable setting item requiring individual setting (S25). When there are multiple setting items designated by the designated setting item contained in the setting item designating information included in the setting file IFS, the process of S25 is repeatedly executed such that a different one of the multiple setting items is subjected at each execution of S25.

Figure 6:
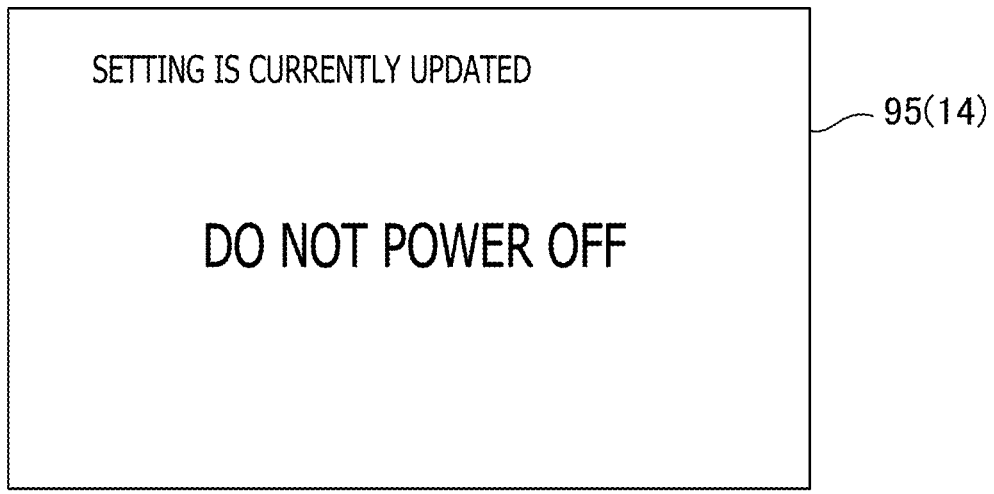
FIG. 6 shows an example of an update indicating screen displayed on the touch panel shown in FIG. 1.

When it is determined that the setting item is the variable setting item (S25: YES), the controller 10 skips S26 (described later) and proceeds to S27. When it is determined that the setting item is not the variable setting item (S25: NO), that is, the setting item is determined to be the fixed setting item, the controller 10 sets the setting information of the setting item corresponding to the fixed setting item stored in the setting information DB 13b to the designated setting information contained in the setting file IFS obtained in S14, and stores the same in the setting information DB 13b S26 (S26 being an example of a first setting process). At this stage, the update indicating screen 95 as shown in FIG. 6 is displayed on the touch panel 14. The update indicating screen 95 is continuously displayed on the touch panel 14 until a process of S29 (described later) is executed. Thereafter, the controller 10 increments the counter N by one (S27) and returns to S24.

Further, when it is determined that the counter N is equal to or greater than the variable C (S24: NO), the controller 10 stores result information regarding success/failure of the first setting process (S26) and the second setting process (S21) in the USB memory 3 in S29 (S29 being an example of a result storing process). When both the first setting process and the second setting process have been completed successfully, such states are stored as the result information. When the first setting process has been completed successfully but the second setting process has been failed, a successfully-completed state of the first setting process and a reason why the second setting process has been failed are stored as the result information. When the first setting process has been failed but the second setting process has been completed successfully, a reason why the first setting process has been failed and a successfully-completed state of the second setting process are stored as the result information. When both the first setting process and the second setting process have been failed, the reasons why the first and second setting processes have been failed are stored as the result information. It is noted that causes of failure of the setting processes may include an inappropriate name of the setting item, inappropriate designated setting information and the like. The inappropriate name of the setting item occurs when description of the name of the setting item is incorrect. The inappropriate designated setting information occurs when, for example, a value of the designated setting information is different from a value to be taken (e.g., when the value of the designated setting information should be a character string but the result indicates a numerical value).

Figure 7:
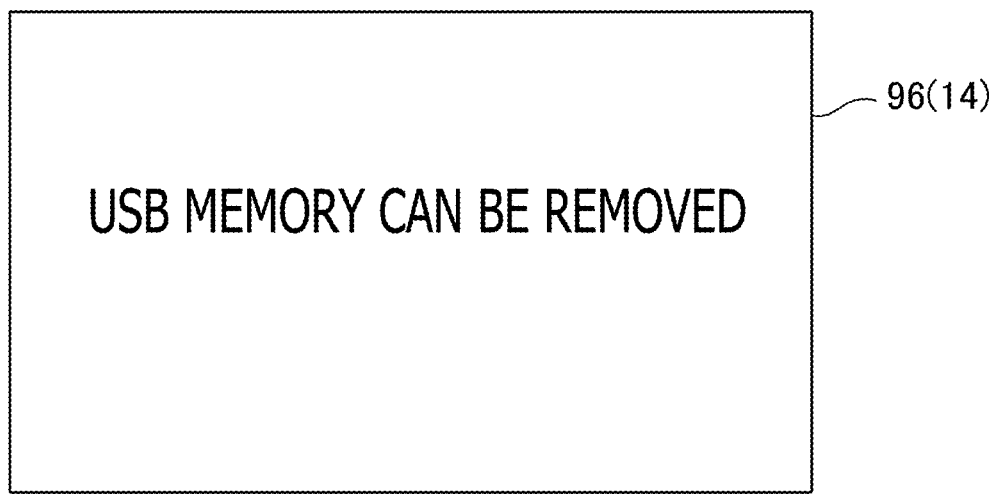
FIG. 7 shows an example of a removability notifying screen displayed on the touch panel shown in FIG. 1.

After completion of the result storing process to store the result information in the USB memory 3 in S29, the controller 10 displays a removability notifying screen 96 (see FIG. 7) on the touch panel 14 in S30 (S30 being an example of a memory release permission process). Accordingly, it becomes possible to notify the user that the connection of the USB memory 3 with the USB OF 18 becomes releasable. Thereafter, the controller 10 restarts the MFP 1A in S31 (S31 being an example of a restart process) and the controller 10 terminates the setting process.

As described above, the controller 10 of the MFP 1A according to the first illustrative embodiment is configured to obtain, from the USB memory 3 connected to the USB OF 18, the setting item designating information designating one or more setting items among the multiple setting items and the setting changing file IFS including designated setting information which is the setting information of at least one setting item among one or more setting items. Then, the controller 10 determines whether each of the one or more setting items designated by the setting item designating information included in the obtained setting file is the fixed setting item requiring individual setting information or the variable setting item requiring individual setting information in S18 or S25 (S18 of FIG. 3A and S25 of FIG. 3B being examples of a changing necessity determining process).

Figure 3B:
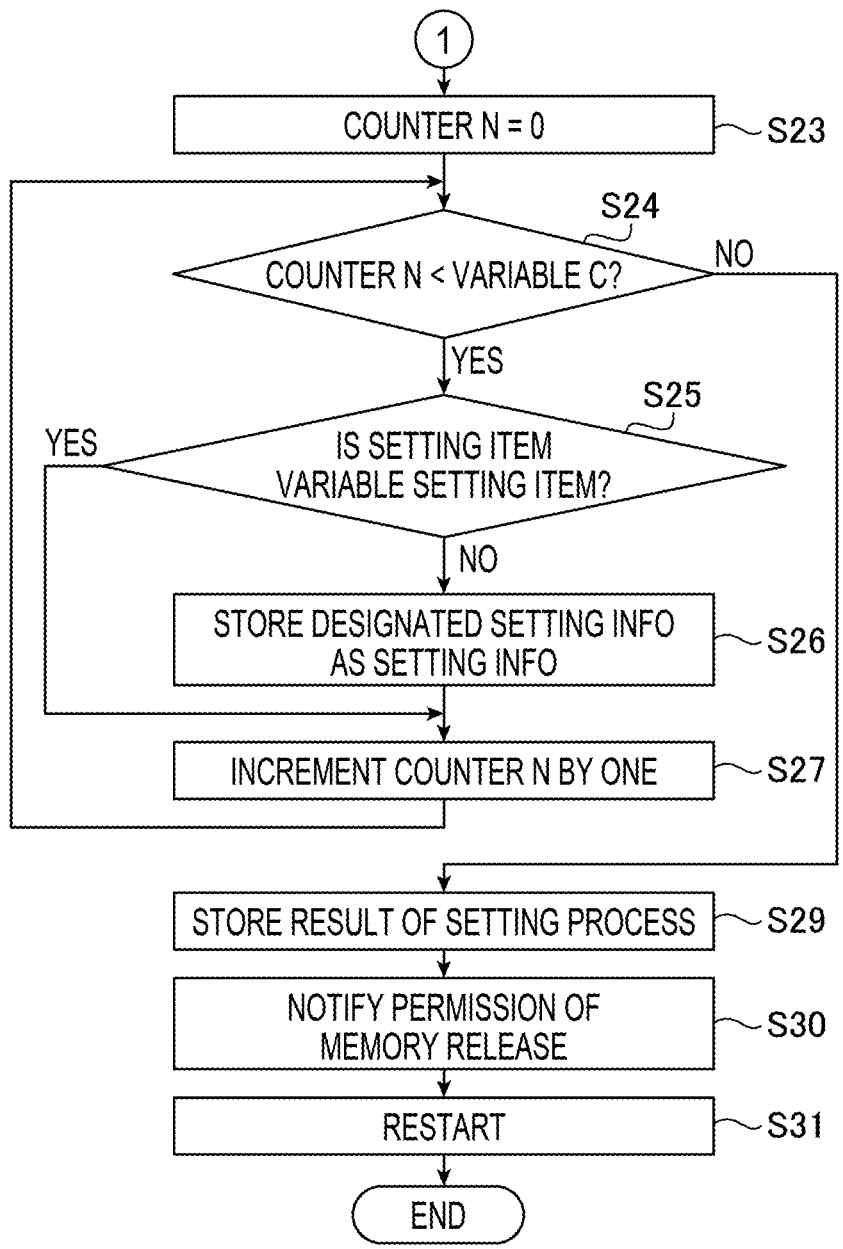

Then, the controller 10 stores the setting information regarding the setting items which are determined to be the fixed setting items in the setting information DB 13b based on the designated setting information included in the setting changing file IFS in S26 of FIG. 3B. (S26 being an example of the first setting process). Further, the controller 10 stores the setting information regarding the setting items determined to be the variable setting items in the setting information DB 13b based on the receiving setting information which is the setting information received through the setting information input screen 92, 93 or 94 displayed on the touch panel 14 in S21 (S21 being an example of the second setting process).

Thus, regarding the fixed setting items, the controller 10 can store the setting information in the setting information DB 13b based on the designated setting information contained in the setting changing file IFS obtained from the USB memory 3. Further, regarding the fixed setting items, the controller 10 can store the setting information in the setting information DB 13b based on the received setting information input by the user. As above, for the multiple MFP's 1A and 1B which require settings based on both the setting based on the common setting information and the setting based on the individual setting information, by preparing only one setting changing file IFS, settings can be made easily and efficiently.

According to the first illustrative embodiment above, after executing the first setting process and the second setting process, the controller 10 stores the result information regarding the success/failure of the first setting process and the second setting process in the USB memory 3 in S29 of FIG. 3B (S29 being an example of the result storing process). After storing the result storing information, the controller 10 restarts the MFP 1A in S31 of FIG. 3B (S31 being an example of the restart process). Accordingly, by storing the result information regarding the first setting process and the second setting process before restarting the MFP 1A, it is possible to notify the user of the result information quickly.

Further, according to the first illustrative embodiment, when there are multiple setting items which are determined to be the variable setting items in the changing necessity determining process (S18 of FIG. 3A), the controller 10 receives the setting information corresponding to the multiple variable setting items continuously. Therefore, the setting information input screen 92, 93 or 94 for receiving the setting information is displayed successively on the touch panel 14 (S19 of FIG. 3A). Accordingly, the user can input the setting information for the multiple variable setting items successively and efficiently.

According to the first illustrative embodiment, the setting information input screen 92, 93 or 94 is displayed on the touch panel 14 before execution of the first setting process (S26 of FIG. 3B) to encourage the user to input the setting information. Therefore, in comparison with a case where the setting information screen 92, 93 or 94 is displayed on the touch panel 14 after execution of the first setting process, the user can start inputting the setting information regarding the setting items which are the variable setting items earlier. Therefore, the user can complete a setting operation of the MFP 1A quickly.

In the first illustrative embodiment, after execution of the result storing information (S29 of FIG. 3B), the removability notifying screen 96 is displayed on the touch panel 14 to notify the user that the USB memory 3 can be disconnected from the USB I/F 18 in S30 of FIG. 3B (S30 being an example of a connection release permitting process). Therefore, the user can recognize, at an appropriate timing, that the result information has been stored in the USB memory 3 and the USB memory 3 can be disconnected.

Further, in the first illustrative embodiment, when the designated setting information included in the setting changing file IFS contains a character string "User Select" (i.e., case one), the controller 10 determines that a setting item corresponding to the designated setting information as the variable setting item. Therefore, when there is a setting item of which setting information is to be set individually, by making the designated setting information contain the character string "User Select", the setting can be performed efficiently.

Further, in the first illustrative embodiment above, when the designated setting information included I the setting changing file IFS partially contains the character string "xxx" (i.e., case two), the controller 10 determines a setting item corresponding to the designated setting information as the variable setting item. Therefore, only a part of the designated setting information can be made to be settable individually. For example, when there is an IP address including four areas of numerals delimited by dots, there is a case where only one of the four areas should be set individually, while common values should be set in the other three areas for each of the MFP 1A and the MFP 1B. In such a case, by including the character string "xxx" at a portion, where a value is to be set individually, of the designated setting information, the setting can be performed efficiently.

In addition, according to the first illustrative embodiment, when the designated setting information included in the setting changing file IFS corresponds to the restricted setting item but does not satisfy a restriction condition stored in the restriction condition DB 13c (i.e., case three), the controller 10 determines the setting item corresponding to the designated setting information as the variable setting item. Therefore, when a designated setting information corresponding to the restricted setting item included in the setting changing file IFS cannot be used as the setting information, the controller 10 determines the setting item corresponding to the designated setting information as the variable setting item, and encourages the user to input the setting information. Accordingly, even when there is a case where the designated setting information of the setting changing file IFS is not appropriate, it can be replaced with an appropriate value based on the user input.

Second Embodiment

Next, an MFP according to a second illustrative embodiment will be described. The MFP according to the second illustrative embodiment, the setting process is different from that of the MFP 1A according to the first illustrative embodiment. The hardware configuration of the second embodiment is similar to that of the MFP 1A according to the first illustrative embodiment, and description thereof will be omitted.

Figure 8:
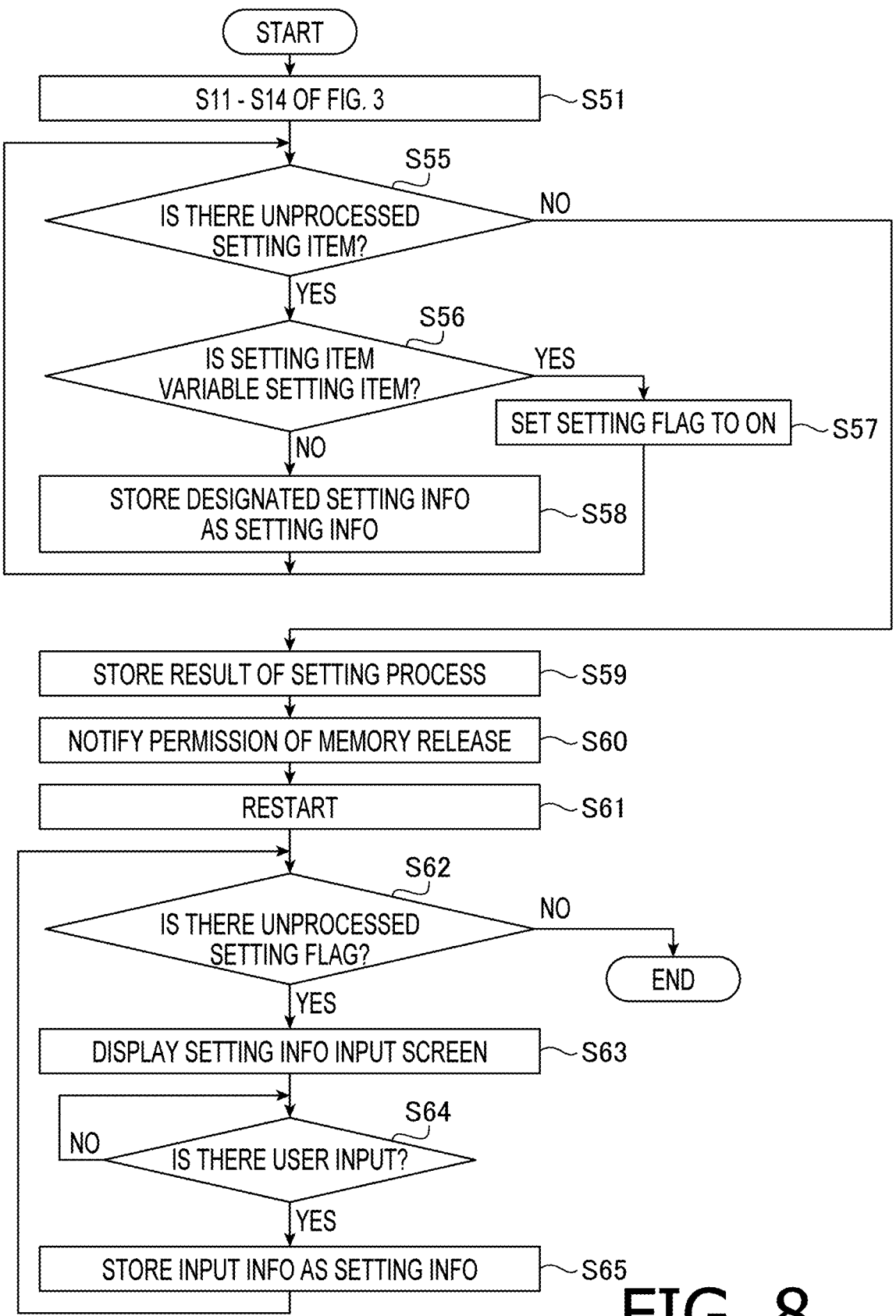
FIG. 8 is a flowchart illustrating an example of a setting process executed in an MFP according to a second illustrative embodiment of the present disclosures.

As shown in FIG. 8, when the setting process is performed by the controller of the MFP according to the second embodiment, firstly a process similar to the process in S11-S14 of the first embodiment (see FIG. 3) is performed (S51). Next, among the setting items designated by the setting item designating information of the setting changing file IFS which is obtained in S51 (i.e., in a process similar to S14 of FIG. 3), it is determined whether there is a setting item to which a process relating to the setting (i.e., S57 or S58 described later) has not been applied (S55).

When it is determined that there is a setting item on which the process regarding the setting has not been performed (S55: YES), regarding one of the setting items designated by the setting item designating information included in the setting changing file IFS obtained in S14, the controller 10 determines whether the setting item is the variable setting item requiring the individual setting in S56 (S56 being an example of the changing necessity determining process). When it is determined that the setting item subject to determination is determined to be a variable setting item (S56: YES), the controller 10 sets the setting flag of the setting item to ON (S57). Thereafter, the controller 10 returns to S55. When it is determined that the setting item subject to determination is not the variable setting item but the fixed setting item (S56: NO), the setting information corresponding to the fixed setting item stored in the setting information DB 13b is set to the designated setting information included in the setting changing file IFS obtained in S14 (S58: first setting process). At this stage, an update indicating screen 95 (FIG. 6) is displayed on the touch panel 14. The update indicating screen 95 is continuously displayed on the touch panel 14 until a process S59 (described later) is executed. Thereafter, the controller 10 returns to S55.

In S55, for all the setting items designated by the setting item designating information of the setting changing file IFS obtained in the process corresponding to S14, when it is determined that the process regarding setting has been done (S55: NO), the controller 10 stores the result information regarding the success/failure in the first setting process in S58 in the USB memory 3 in S59 (S59 being an example of a result storing information). After the result storing information is finished, the controller 10 displays the removability notifying screen (see FIG. 7) on the touch panel 14 in S60 (S60 being an example of a connection release permission process).

After the MFP 1A is restarted, the controller 10 determines whether there remains a setting item on which the setting process of the setting information corresponding to the setting item among the setting items of which setting flags are set to ON in S57 (i.e., the variable setting items) (S62). When it is determined that there remains a setting item on which the setting process is not executed (S62: YES), the controller 10 displays the setting information input screen 92, 93 or 94 (FIG. 5A, 5B or 5C) for receiving the setting information regarding the setting item on the touch panel 14 (S63). Thereafter, the controller 10 determines whether the setting information is input by the user through the setting information input screen 92, 93 or 94 (S64).

Determination in S64 is repeated until it is determined that the setting information has been input. When it is determined that the setting information is input (S64: YES), the controller 10 sets the setting information of the setting item corresponding to the variable setting item stored in the setting information DB 13b to the received setting information which is the setting information input through the setting information input screen 92, 93 or 94, and stored the same in the setting information DB 13b in S65 (S65 being an example of the second setting process). Thereafter, the controller 10 returns to S62 and determines whether there remain unprocessed setting items of which setting flags are set to ON in S57. It is noted that, when there are multiple setting items of which setting flags are set to be ON in S57 (i.e., there are multiple variable setting items), the setting information input screen 92, 93 or 94 is continuously displayed on the touch panel 14 to input the setting information for the multiple setting items.

When it is determined in S62 that, for all the setting items of which setting flags are set to be ON in S57 (i.e., the variable setting items), the setting process of the corresponding setting information is processed (S62: NO), the controller 10 terminates the setting process.

As above, according to the second illustrative embodiment, only by preparing one setting changing file IFS, setting can be performed on multiple MFP's which require setting based on the common setting information, and setting based on the individual setting information as in the first illustrative embodiment.

Further, according to the above-described embodiment, after executing the first setting process for the fixed setting items in S58, the controller 10 performs the result storing process to store tine result information in the USB memory 3 in S59, and connection of the USB memory 3 with the USB I/F 18 is releasable (S60). Thereafter, in S63, the controller 10 displays the setting information input screen 92, 93 or 94 to receive setting information regarding the variable setting items, and executes the second setting process (S65) based on the setting information input through the screen 92, 93 or 94. It is noted that the inputting operation of the setting information the user performs through the setting information input screen 92, 93 or 94 is a time-consuming operation. According to the second illustrative embodiment, before the user starts the inputting operation of the setting information through the setting information input screen 92, 93 or 94, the USB memory 3 is set to a state where the USB memory 3 can be released from the connection with the USB I/F 18. Therefore, when the user is performing the inputting operation through the setting information input screen 92, 93 or 94, the USB memory 3 can be connected to the USB I/F 18 of another MFP to start setting of another MFP. Accordingly, setting of the multiple MFP's can be performed more efficiently.

It is noted that concrete configurations of the illustrative embodiments should not be limited to those described above. Rather, aspects of the present disclosures should include those set forth in the claims, equivalents and modifications thereof, and the above-described configurations could be further modified without departing from the aspects of the present disclosures.

For example, according to the first illustrative embodiment, for all the setting items determined to be the variable setting items among the setting items designated by the setting item designating information included in the setting changing file IFS, the second process is performed. After execution of the second setting process, the first setting process to set setting information regarding all the setting items determined to be the fixed setting items is executed. Such a configuration may be changed so that after execution of the first setting process to set setting information regarding all the setting items determined to be the fixed setting items, the second setting process may be performed to set the setting information for all the setting items determined to be the variable setting items. Alternatively, the first setting process and the second setting process may be executed in parallel.

Hereinafter, referring to FIG. 9, a setting process performed by the controller of the MFP according to a first modification of the first illustrative embodiment will be described. Initially, a process of S11-S16 (FIG. 3A) of the first embodiment is performed (S70). Then, it is determined whether the counter N is less than the variable C (S71). When the value of the counter is determined to be less than the variable C (S71: YES), it is determined, in S72, whether one of setting items designated by the setting item designating information included in the setting changing file IFS obtained in S14 (S72 being an example of the changing necessity determining process).

When it is determined that the setting item is not the variable setting item, that is, the setting item is determined to be the fixed setting item (S72: NO), the controller skips S73 and S74, and proceeds to S76. When it is determined that the setting item is the variable setting item (S72: YES), it is determined whether the variable setting item is the firstly determined to be the variable setting item (i.e., the first variable setting item) in S72 among the setting items designated by the setting item designating information included in the setting changing file IFS obtained in S14 (S73). When it is determined that the setting item is the first variable setting item (S73: YES), an inputting process (see FIG. 10) to input the setting information for the variable setting item is started (S74), and the controller proceeds S76. Thereafter, the process is performed in parallel with the inputting process shown in FIG. 10.

When it is determined that the first setting item is not eh variable setting item (S73: NO), the controller turns ON a setting flag for the setting item (S75). Thereafter, the controller increments the counter N by one (S76) and returns to S71. When it is determined that the counter N is equal to or greater than C (S71: NO), a process the same as S23-S31 (FIG. 3A) of the first illustrative embodiment is performed (S77) and the controller terminates the setting process.

Next, referring to FIG. 10, the inputting process performed in S74 of FIG. 9 will be described. Firstly, the controller displays the information input screen 92, 93 or 94 (see FIGS. 5A, 5B and 5C) on the touch panel 14 to receive the setting information regarding the setting item determined to be the first variable setting item in S73 (FIG. 9) in S81. Then, the controller determines whether the setting information is input by the user through the setting information input screen 92, 93 or 94 (S82). Determination in S82 is repeated until it is determined that the setting information is input. Thereafter, when it is determined that the setting information is input (S82: YES), the setting information of the setting item corresponding to the variable setting item stored in the setting information DB 13b in the setting information DB 13b as the received setting information which is the setting information input through the setting information input screen 92, 93 or 94 (S83: second setting process).

Figure 9:
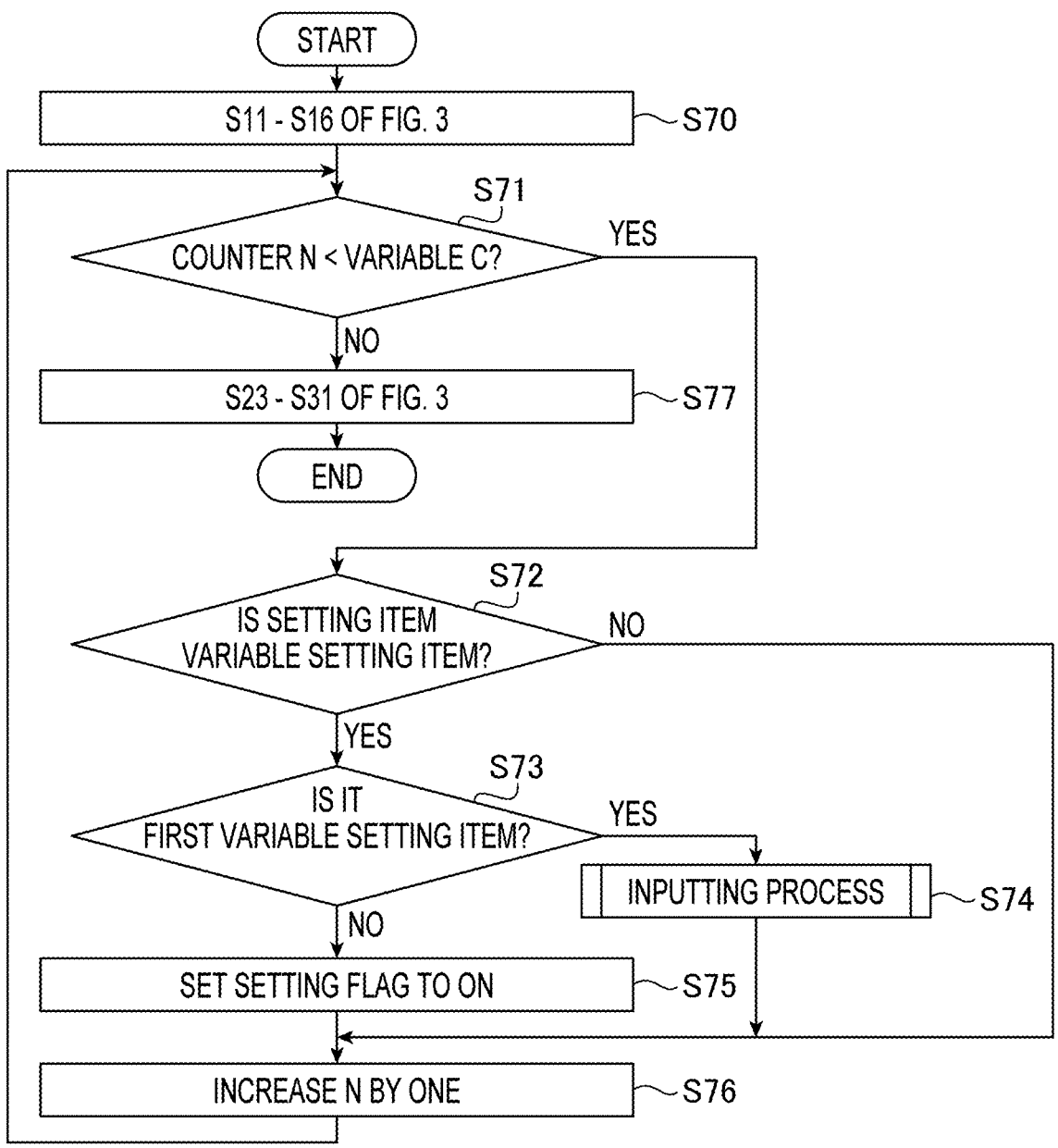
FIG. 9 is a flowchart illustrating an example of a setting process executed in an MFP according to a first modification of the first embodiment of the present disclosures.
Figure 10:
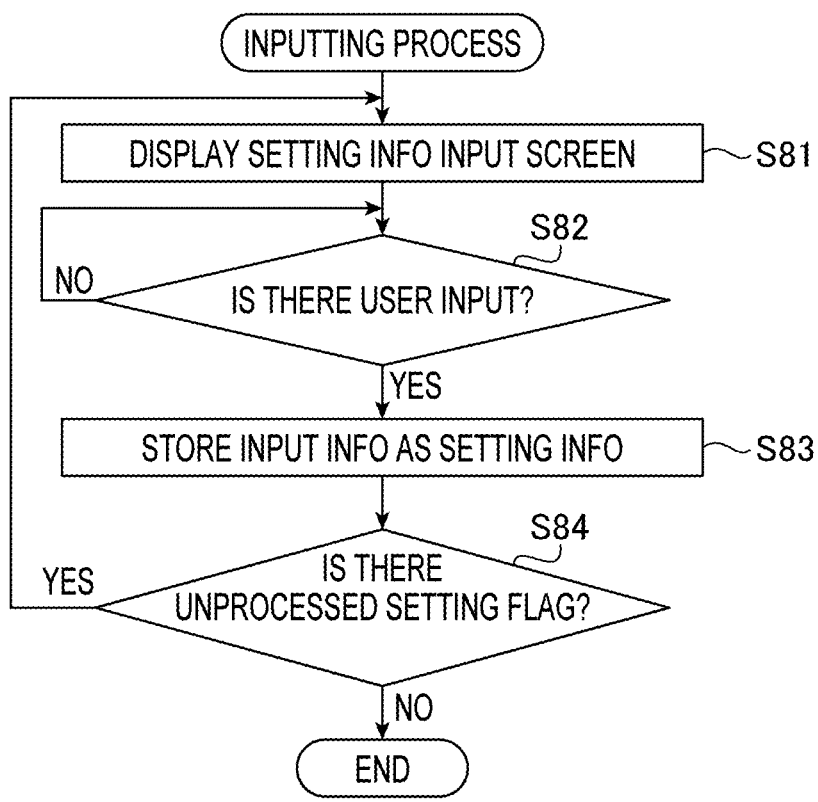
FIG. 10 is a flowchart illustrating an example of an inputting process executed in the setting process shown in FIG. 9.

It should be noted that the inputting process shown in FIG. 10 is executed in parallel with the process in S74 onwards of FIG. 9. Therefore, when, in the inputting process, the user is performing the inputting operation through the setting information input screen 92, 93 or 94, setting flags of second and later variable setting items are set to ON in S75 of FIG. 9. Therefore, after execution of S83, the controller determines whether there remain setting items of which setting flags are set to ON in S75 (FIG. 9) (i.e., the second and later variable setting items) and the setting process of the setting information regarding the setting items have not been performed (S84). When it is determined that there remain the setting items for which the setting process has not been performed (S84: YES), the controller returns to S81 and displays the setting information input screen 92, 93 or 94 (FIG. 5A, 5B or 5C) for receiving the setting information for the setting item on the touch panel 14. When it is determined that, for all the setting items of which setting flags are set to ON in S84 (i.e., the second and later variable setting items), the setting process of the corresponding setting information has been performed (S84: NO), the controller terminates the inputting process.

The MFP according to the first modification of the first embodiment is configured to execute the first setting process for setting the setting information regarding the fixed setting item when the user is performing the inputting operation to input the setting information regarding the variable setting items (i.e., during the inputting process shown in FIG. 10), a time period required for setting can be reduced.

In the above-described embodiment, by displaying the setting information input screen 92, 93 or 94 (FIG. 5A, 5B or 5C) on the touch panel 14, the user is encouraged to perform inputting operation to input setting information regarding the variable setting items through the touch panel 14. It is noted that such a notification to the user is not limited to usage of the touch panel 14. For example, the notification may be made by an audible messages output by a speaker.

Figure 11:
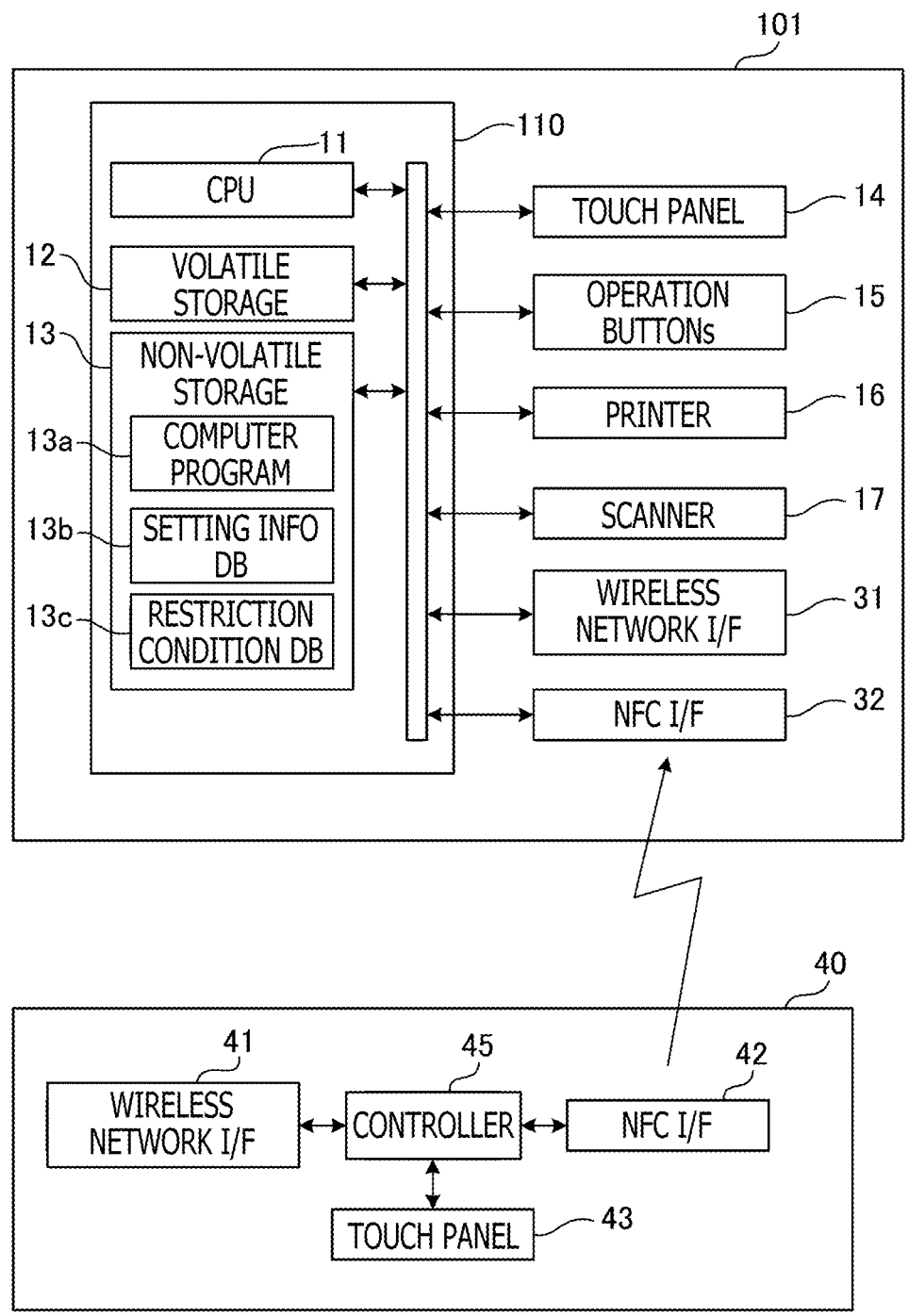
FIG. 11 is a block diagram of a system including an MFP according to a second modification of the first embodiment of the present disclosures.

In addition, according to the above-described embodiment, a case where the setting changing file IFS is obtained from the USB memory 3 connected to the USB I/F 18. The configuration can be modified such that the setting changing file IFS may be obtained from a memory card such as an SD card or smart media, an optical disc such as a DVD-ROM or a magnetic disk instead of the USB memory 3. Further alternatively, the setting changing file IFS may be obtained from an external device such as a mobile terminal. For example, as shown in FIG. 11 which shows a second modification of the first illustrative embodiment, to a controller 110 of an MFP 101, a wireless network I/F 31 and an NFC I/F 32 are electrically connected. Further, a controller 45 of a mobile terminal 40 is electrically connected with a wireless network I/F 41, an NFC I/F 42 and a touch panel 43.

The wireless network I/F 31 and the wireless network I/F 41 are interfaces configured to perform a wireless communication complaint with Wi-Fi® standard. The NFC I/F 32 and the NFC I/F 42 are interfaces configured to perform a wireless communication (i.e., an NFC communication) complaint with an NFC standard. The NFC communication is known as a near field communication having a very short communicable distance (e.g., about 10 cm) and the NFC communication is established when a transmitting device and a receiving device are located to be very close to (or contact with) each other.

According to the second modification, firstly the user moves the mobile terminal 40 close to the MFP 101 so that the NFC communication is established therebetween. Then, a trigger file for executing a setting process stored in the mobile terminal 40 is transmitted to the MFP 101. The trigger file contains various information including an IP address of the mobile terminal 40. When the trigger file transmitted from the mobile terminal 40 is received, the MFP 101 establishes the Wi-Fi® communication between the MFP 101 and the mobile terminal 40 based on the IP address information of the mobile terminal 40 contained in the trigger file. Then, the MFP 101 obtains the setting changing file IFS from the mobile terminal 40 which is connected in accordance with the Wi-Fi® communication.

It is noted that, in the above-described second modification, the setting information input screen 92, 93 or 94 (see FIG. 5A, 5B or 5C) for receiving the setting information regarding the setting items which are the variable setting items may be displayed on a touch panel 43 of the mobile terminal 40.

In the above-described embodiments/modifications, cases where aspects of the present disclosures are applied to the MFP's 1A and 1B. It is also possible to apply the aspects of the present disclosures to another image processing device such as a standalone scanner, printer or digital camera. It is further noted that the aspects of the present disclosures can be applied not only to image processing devices, but to music playback devices, storages and electronic devices (e.g., a communication device of a router).

What is claimed is:

1. An electronic device, comprising:
a memory;
an interface configured to be connected with an external device;
a receiving section configured to received input information input by a user; and
a controller,
wherein the memory is configured to store setting information corresponding to a plurality of setting items regarding the electronic device, and
wherein the controller is configured to control an operation of the electronic device based on the setting information stored in the memory,
the controller being configured to perform:
an obtaining process of obtaining, from the external device connected to the interface, a setting file containing setting item designating information and designated setting information, the setting item designating information indicating one or more setting items among a plurality of setting items regarding the electronic device, the designated setting information being setting information of at least one of the one or more setting items;
a changing necessity determining process of determining each of the one or more setting items designated by the setting item designating information included in the setting file obtained in the obtaining process is which one of a fixed setting item which does not require individual setting information and a variable setting item which requires the individual setting information;
a first storing process of storing the setting information regarding the setting item determined to be the fixed setting item in the changing necessity determining process based on the designated setting information included in the setting file obtained in the obtaining process;
a notifying process of causing the notifying section to notify a user of information asking for the user operation so that the receiving section receives the setting information regarding the setting item determined, in the changing necessity determining process, to be the variable setting item; and
a second storing process of storing the setting information regarding the setting item determined, in the changing necessity determining process, to be the variable setting item in the memory based on the received setting information which is the setting information received through the receiving section.

2. The electronic device according to claim 1,
wherein the controller is further configured to perform:
a result storing process of storing result information regarding success and failure of the first setting process and the second setting process in the external device after execution of the first setting process and the second setting process; and
a restarting process of restarting the electronic device after execution of the result storing process.

3. The electronic device according to claim 2,
wherein, when there are multiple setting items determined to be the variable setting items in the changing necessity determining process, the controller is further configured to cause the notifying section to notify information asking for a user operation in the notifying process in order for the receiving section to subsequently receive the setting information corresponding to the multiple variable setting items.

4. The electronic device according to claim 2,
wherein the controller is configured to execute the notifying process before the first setting process is executed.

5. The electronic device according to claim 4,
wherein the controller executes the notifying process and the first setting process in parallel.

6. The electronic device according to claim 1,
wherein the controller is configured to:
execute a result storing process of storing result information regarding the success and failure of the first setting process in the external device after execution of the first setting process; and
execute a restart process of restarting the electronic device after execution of the result storing process; and
execute the notifying process after execution of the restart process.

7. The electronic device according to claim 1,
wherein the external device comprises a removable memory, and
wherein the controller further executes a connection removal permission process causing the notifying section to notify that a connection of the removable memory to the interface is releasable.

8. The electronic device according to claim 1,
wherein, when the designated setting information contained in the setting file obtained in the obtaining process includes a first character string, the controller determines, in the changing necessity determining process, that the setting item corresponding to the designated setting information is the variable setting item.

9. The electronic device according to claim 1,
wherein the memory stores restriction condition which defines usable setting information for restricted setting items which are setting items among the multiple setting items, information usable as the setting information for the restricted setting items being restricted, and
wherein, when it is determined in the changing necessity determining process that, the setting file obtained in the obtaining process includes the designated setting information corresponding to the restricted setting item and the designated setting information corresponding to the restricted setting item does not satisfy the restriction condition, the controller determines the setting items corresponding to the designated setting information as the variable setting items.

10. The electronic device according to claim 1,
wherein the controller is further configured to:
in the changing necessity determining process, when the designated setting information included in the setting file obtained in the obtaining process partially includes a second character string, determine the setting item corresponding to the designated setting information as the variable setting item; and
in the second setting process, store setting information regarding the setting item determined to be the variable setting item in the changing necessity determining process based on received setting information which is the setting information in which the second character string included in the designated setting information included in the setting file obtained in the obtaining process is replaced with information received through the receiving section.

11. The electronic device according to claim 1,
wherein the notifying section is configured to notify the user of information.

12. A setting method of an electronic device having a memory, an interface configured to be connected with an external device, a receiving section configured to received input information input by a user and a controller, the memory being configured to store setting information corresponding to a plurality of setting items regarding the electronic device, the controller being configured to control an operation of the electronic device based on the setting information stored in the memory,
the method comprising:
an obtaining step of obtaining, from the external device connected to the interface, a setting file containing setting item designating information and designated setting information, the setting item designating information indicating one or more setting items among a plurality of setting items regarding the electronic device, the designated setting information being setting information of at least one of the one or more setting items;
a changing necessity determining step of determining each of the one or more setting items designated by the setting item designating information included in the setting file obtained in the obtaining step is which one of a fixed setting item which does not require individual setting information and a variable setting item which requires the individual setting information;
a first storing step of storing the setting information regarding the setting item determined to be the fixed setting item in the changing necessity determining step based on the designated setting information included in the setting file obtained in the obtaining step;
a notifying step of causing the notifying section to notify a user of information asking for a user operation so that the receiving section receives the setting information regarding the setting item determined, in the changing necessity determining step, to be the variable setting item; and
a second storing step of storing the setting information regarding the setting item determined, in the changing necessity determining step, to be the variable setting item in the memory based on the received setting information which is the setting information received through the receiving section.

13. A non-transitory computer-readable recording medium for an electronic device having a memory, an interface configured to be connected with an external device, a receiving section configured to received input information input by a user and a controller, the memory being configured to store setting information corresponding to a plurality of setting items regarding the electronic device, and the controller being configured to control an operation of the electronic device based on the setting information stored in the memory, the instructions cause, when executed by the controller, the electronic device to perform:

an obtaining process of obtaining, from the external device connected to the interface, a setting file containing setting item designating information and designated setting information, the setting item designating information indicating one or more setting items among a plurality of setting items regarding the electronic device, the designated setting information being setting information of at least one of the one or more setting items;

a changing necessity determining process of determining each of the one or more setting items designated by the setting item designating information included in the setting file obtained in the obtaining process is which one of a fixed setting item which does not require individual setting information and a variable setting item which requires the individual setting information;

a first storing process of storing the setting information regarding the setting item determined to be the fixed setting item in the changing necessity determining process based on the designated setting information included in the setting file obtained in the obtaining process;

a notifying process of causing the notifying section to notify a user of information asking for a user operation so that the receiving section receives the setting information regarding the setting item determined, in the changing necessity determining process, to be the variable setting item; and a second storing process of storing the setting information regarding the setting item determined, in the changing necessity determining process, to be the variable setting item in the memory based on the received setting information which is the setting information received through the receiving section.

* * * * *